ADJUSTABLE FREQUENCY DIVIDER

Filed Oct. 23, 1964 4 Sheets-Sheet 1

INVENTORS
JOHANNES NOORDANUS
MARINUS A. BOS
LEONARDUS M. VAN DER HART
BY
Frank R. Trifari
AGENT INVENTORS
JOHANNES NOORDANUS
MARINUS A. BOS
LEONARDUS M. VAN DER HART
BY
Frank R. Trifari
AGENT

| | $F_1$ | $F_2$ | $F_3$ | $F_4$ |
|---|---|---|---|---|
| 0 | 0 | 0 | 0 | 1 |
| 1 | 1 | 0 | 0 | 1 |
| 2 | 0 | 1 | 0 | 1 |
| 3 | 1 | 1 | 0 | 1 |
| 4 | 0 | 0 | 1 | 1 |
| 5 | 1 | 0 | 1 | 1 |
| 6 | 0 | 1 | 1 | 1 |
| 7 | 1 | 1 | 1 | 1 |
| 8 | 0 | 1 | 1 | 0 |
| 9 | 1 | 1 | 1 | 0 |

INVENTORS
JOHANNES NOORDANUS
MARINUS A. BOS
LEONARDUS M. VAN DER HART
BY
Frank R. Trifari
AGENT May 21, 1968 J. NOORDANUS ETAL 3,384,827

ADJUSTABLE FREQUENCY DIVIDER

Filed Oct. 23, 1964 4 Sheets-Sheet 4

| | $F_1$ | $F_2$ | $F_3$ | $F_4$ |
|---|---|---|---|---|
| 0 | 0 | 1 | 1 | 0 |
| 1 | 1 | 1 | 1 | 0 |
| 2 | 0 | 0 | 0 | 1 |
| 3 | 1 | 0 | 0 | 1 |
| 4 | 0 | 0 | 0 | 0 |
| 5 | 1 | 0 | 0 | 0 |
| 6 | 0 | 1 | 0 | 0 |
| 7 | 1 | 1 | 0 | 0 |
| 8 | 0 | 0 | 1 | 0 |
| 9 | 1 | 0 | 1 | 0 |

INVENTORS
JOHANNES NOORDANUS
MARINUS A. BOS
LEONARDUS M. VAN DER HART
BY
Frank R. Trifari
AGENT 3,384,827
Patented May 21, 1968

3,384,827

ADJUSTABLE FREQUENCY DIVIDER

Johannes Noordanus and Marinus Anton Bos, Hilversum, and Leonardus Maria van der Hart, Apeldoorn, Netherlands, assignors to North American Philips Company, Inc., New York, N.Y., a corporation of Delaware Filed Oct. 23, 1964, Ser. No. 406,056
Claims priority, application Netherlands, Oct. 24, 1963, 299,710
5 Claims. (Cl. 328—42)

The invention relates to an adjustable frequency divider comprising the cascade arrangement of a number of adjustable frequency dividing stages. Each dividing stage comprises an input, an output, a number of setting conductors and a setting terminal. Each counting pulse supplied to the input of a frequency dividing stage converts the dividing stage from one stable counting condition into another stable counting condition. An input pulse converts the dividing stage to its original counting condition after a number of input pulses and, on reaching an output counting condition, an output pulse is applied to the output which is connected to the input of the following frequency dividing stage in the cascade arrangement. Each frequency dividing stage comprises a selection switch for selecting certain setting conductors, and a pulse transmission circuit is provided between the output of the last frequency dividing stage and the setting terminal of each frequency dividing stage. A setting pulse transmitted to the setting terminal of a frequency dividing stage is supplied to the setting conductor selected by means of the selection switch for presetting a selected counting condition.

Such adjustable frequency dividers are used for example in apparatus for stabilizing high-frequency oscillators by means of frequency division and comparing the frequency-divided oscillator signal with the frequency of a crystal reference oscillator of, for example, 1 kc./s., in which, after established frequency stabilization, the oscillator frequency in multiples of 1 kc./s. equals the frequency division factor adjusted by means of the adjustable frequency divider.

It is the object of the invention to provide a new system for a frequency divider of the above mentioned type, which is suitable for high frequency and/or a large number of frequency division stages.

According to the invention an adjustable frequency divider is provided in which the said pulse transmission circuit between the output of the last frequency division stage and the setting terminal of at least the first frequency division stage comprises a pulse regenerator which regenerates the output pulse of the last frequency division stage at the setting terminal of at least the first frequency division stage at an instant between two successive input pulses of the relative frequency division stage.

In order that the invention may readily be carried into effect it will now be described more fully, by way of example, with reference to the accompanying drawing, in which FIG. 1 shows a block schematic diagram of an adjustable frequency divider.

Figure 1:
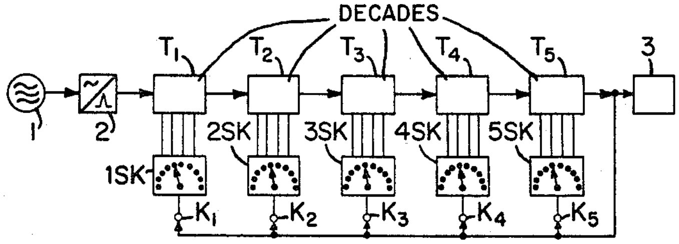
PRIOR ART FIG. 1

The adjustable frequency divider shown in FIG. 1 comprises the cascade arrangement of a number of adjustable frequency division stages T1–T5, a high frequency oscillator 1 of, for example, 30 mc./s., a pulse shaper 2 and a load 3. The output oscillation of oscillator 1 is converted, by the pulse-shaper 2, into a series of counting pulses of the same pulse recurrence frequency as the frequency of the oscillator 1. These counting pulses are supplied to the input of the frequency division stage T1. The output of the frequency division stage T1 is connected to the input of the frequency division stage T1 and so on with increasing order of the frequency division stage. The output of the last frequency division stage T5 is connected to a load 3, for example, a device for stabilising the frequency of the oscillator 1 to a multiple of the frequency of a crystal reference oscillator.

The frequency division stages are constructed as counting decades which, normally, supply an output pulse after every ten successive input pulses. The cascade arrangement of the five counting decades thus normally supplies an output pulse to the load 3 after every 100,000 successive input pulses. The counting decades each comprise a selection switch 1SK–5SK each having ten positions by which the frequency divider can be set in a counting condition corresponding to a number of five digits. This presetting takes place after every output pulse of the counting decade T5 which is shown in FIG. 1 by a connection between the output of counting decade T5 and the setting terminals K1–K5 of the five counting decades. If, for example, the desired division factor equals A, that is to say that the adjustable frequency divider must supply an output pulse after every A successive input pulses, the frequency divider, after every output pulse of the counting decade T5, is set in a condition corresponding to the number 100,000—$A$. As a result, after A input pulses the output condition of the frequency divider is reached and the latter supplies an output pulse to the load 3.

In case of a high pulse recurrence frequency of the input pulses of the counting decade T1 and/or a great number of counting decades, the problem arises that an input pulse which results in an output pulse experiences so large a time delay on traversing all the counting decades that a great number of input pulses is supplied to the frequency divider before an output pulse occurs at the output of the frequency divider. At the instant the output pulse appears the frequency divider thus is not in the zero condition but in a counting condition which is determined by the time delay occurring and the pulse recurrence frequency of the input pulses, namely by the number of input pulses which are supplied to the frequency divider between the instant of the occurrence of an input pulse and the output pulse caused by the said input pulse.

Figure 2:
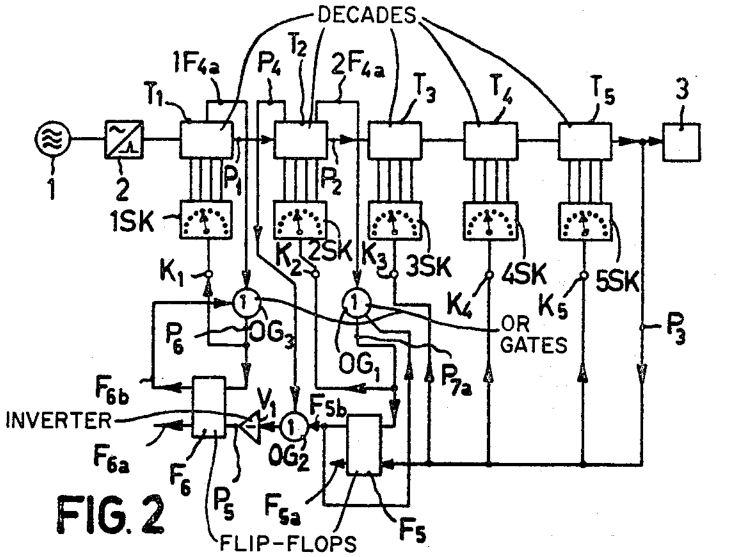
FIG. 2 shows a block schematic diagram of an example of an adjustable frequency divider according to the invention.

FIG. 2 shows an adjustable frequency divider which is suitable for a high pulse recurrence frequency of the input pulses and/or a great number of counting decades. The parts of this adjustable frequency divider which correspond to the parts of the adjustable frequency divider shown in FIG. 1 are indicated by the same reference numerals. The adjustable frequency divider shown in FIG.

Figure 3:
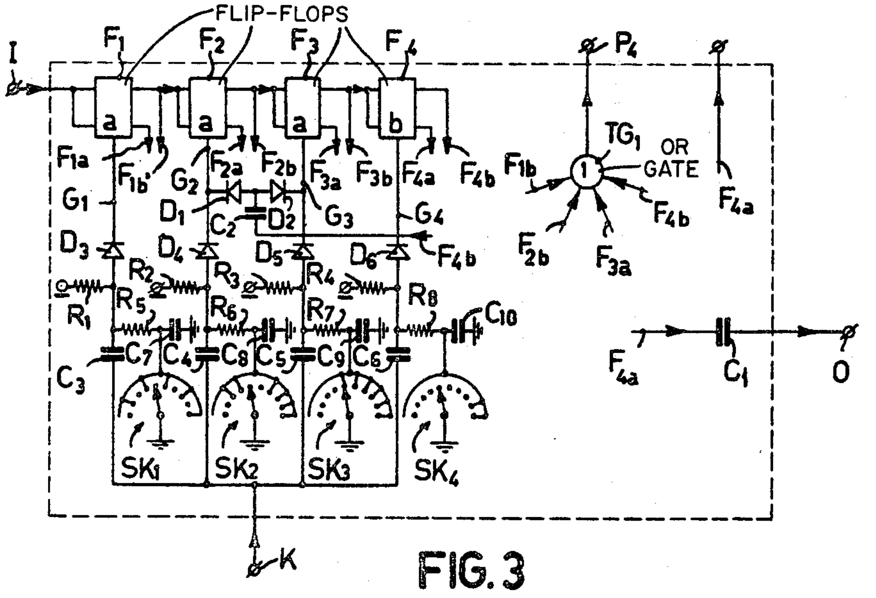
FIG. 3 shows an example of an adjustable frequency division stage suitable for use in the frequency divider shown in FIG. 2.

2 comprises adjustable frequency division stages which are constructed in a manner as shown in FIG. 3. The adjustable frequency division stage shown in FIG. 3 comprises the cascade arrangement of 4 flip-flops F1–F4, an input I, an output O, four setting conductors G1–G4, a setting terminal K, and a selection switch SK with four contact arcs SK1–SK4. The input I of the counting decade is connected to the two trigger inputs united to form one input of the flip-flop F1. One of the two outputs of the flip-flop F1 is connected to the input of flip-flop F2 and so on with increasing order of the flip-flops. An output of the last flip-flop F4 is connected to the output terminal O through a coupling capacitor C1. The flip-flops F1–F4 each comprise two outputs *a* and *b* in which always one output has nearly ground potential and the other output has negative potential. After varying the condition of a flip-flop, which is effected by every positive step in the amplitude of the input voltage, the output which has ground potential before the condition variation changes to a negative potential, and the output which has negative potential before the condition variation changes to ground earth potential. In case of a variation of the condition of a flip-flop a positive and negative step respectively thus occur in the amplitude of the output voltage of the one and the other output respectively. The zero condition of the flip-flop is the condition in which the *a*-output has negative potential. The *b*-output of a flip-flop is connected to the input of the following flip-flop in the cascade arrangement, so that the latter flip-flop varies its condition when the preceding flip-flop is set from condition 1 into condition 0. The *a*-output of flip-flop F4 is connected to the output O so that a positive output pulse occurs if flip-flop F4 is set from condition 0 into condition 1. The four cascade-arranged flip-flops F1–F4 together constitute a binary counting cascade of which the number of counting conditions in principle equals 16.

Every flip-flop further comprises a setting terminal to which one of the setting conductors G1–G4 is connected, in which a setting signal supplied to the setting conductors G1–G4 is connected, in which a setting signal supplied to the setting conductors G1–G3, which signal has the form of a positive amplitude step, sets the flip-flops F1–F3 into the condition 1 and in which a setting signal supplied to a setting conductor G4 sets the flip-flops F4 into the condition 0. The condition of the counting decade may be represented in binary notation if condition 1 of the flip-flops F1–F4 is given the values 1, 2, 4 and 8 respectively. The condition of the counting decade in this manner may be represented by a number which, in binary notation, represents the condition of the flip-flops F1–F4. For example, by the number 15, written as 1111, the condition of the counting decade is indicated in which all the flip-flops F1–F4 are in the condition 1 and, for example, by the number 5 written as 1010, and hereinafter indicated by B5, the condition of the counting decade is indicated in which the flip-flops F1 and F3 are in the condition 1 and the flip-flops F2 and F4 in the condition 0.

If at a given instant the counting decade is in the condition B15, the next following input pulse sets the counting decade in the condition B0 and a positive amplitude step occurs at the *b*-output of flip-flop F4 which step is supplied to the setting conductors G2 and G3 through the coupling capacitor C2 and the diodes D1 and D2 conducting in the pass direction. As a result of this, the flip-flops F2and F3 are set in the condition 1 and the counting decade assumes the condition B6. The total number of possible counting conditions of the counting decade is thus reduced by this counting condition, namely the counting conditions B0 to B5. In the transition from the condition B7 to the condition B8 a positive amplitude step appears at the *a*-output of the flip-flop F4 and a positive pulse appears at the output O. This pulse is supplied to the input of the following counting decade and thus the condition of the first flip-flop of the next decade. The condition B8 of the counting decade is considered the zero condition. In the table shown in FIG. 5, the conditions assumed by the flip-flops F1–F4 in the counting conditions of the counting decade numbered from 0–9 are shown for convenience.

A setting signal supplied to the setting terminal K which has the form of a positive amplitude step is transmitted in accordance with the position of the switch SK to one or more of setting conductors G1–G4. The setting terminal K is connected, through the series arrangement of a coupling capacitor and a diode C3 and D3 respectively, C4 and D4 respectively, C5 and D5 respectively, and C6 and D6 respectively to the setting conductors G1–G4 respectively. The junctions between the coupling capacitors and the diodes are connected on the one side, through the resistors R1–R4, to a point of negative potential which normally cuts off the diodes and, on the other side, they are connected to ground through the series arrangement of a resistor and a decoupling capacitor R5 and C7, respectively, R6 and C8 respectively, R7 and C9 respectively, R8 and C10 respectively, the junctions of which are connected to certain contacts in a contact arc of the switch SK. If the junction between a resistor and a decoupling capacitor, for example R5 and C7, is connected to ground through a contact of contact arc SK1 the negative cut off voltage of diode D3 has decreased to such an extent that a positive amplitude step at terminal K is now supplied, through the coupling capacitor C3 and the diode D3 conducting in the pass direction, to the setting conductor G1.

In contrast with the adjustable frequency divider shown in FIG. 1, the adjustment of the complement of the division factor in the adjustable frequency divider shown in FIG. 2 takes place in parts. The digits at the three highest digit places of the complement of the division factor, which are selected with the switches 3SK–5SK, are adjusted at the instant of occurring of an output pulse of counting decade T5. The digit at the two lowest digit places, which are selected with the switches 1SK–2SK, are adjusted at the instants of occurrence of an output pulse of counting decade T1 and counting decade T2 respectively. The time delay between an input pulse of counting decade T3 and the output pulse of counting decade T5 caused by this input pulse is so slight as compared with the pulse distance between successive input pulses of counting decade T3, that the counting decades T3–T5 at the instants of the occurrence of an output pulse of counting decade T5 are all in the zero condition. The time delay between an input pulse of counting decade T2 and the resulting output pulse of counting decade T5 is of the order of magnitude of the pulse distance between two successive input pulses of counting decade T2, so that a direct pre-adjustment of counting decade T2 by the output pulse of counting decade T5 is not possible. This holds to an even greater extent for counting decade T1 in which in the time interval between an input pulse and the resulting output pulse of counting decade T5 approximately 10 input pulses are supplied to counting decade T1.

Between the output of counting decade T5 and the setting terminals K1 and K2 of the counting decades T1 and T2 is connected a two-stage pulse regenerator. The first regeneration stage regenerates a setting pulse at setting terminal K2 at an instant which coincides with the first output pulse of counting decade T2 which occurs after the output pulse of counting decade T5. The second regeneration stage regenerates a setting pulse at the setting terminal K1 at an instant which coincides with the first output pulse of counting decade T1 which occurs after the instant at which the second regeneration stage is actuated by the first regeneration stage. For the latter an instant is chosen at which counting decade T2 is set in condition 3. At this instant the first regeneration stage is actuated with certainty by the output pulse of counting decade T5. If the time delay between the input pulse of counting decade T2 and the resulting output pulse of counting decade T5 is larger than three times the pulse distance between two successive input pulses of counting decade T2, the instant at which the second regeneration stage is actuated by the first regeneration station should be shifted to a later instant.

Figures 4, 5:
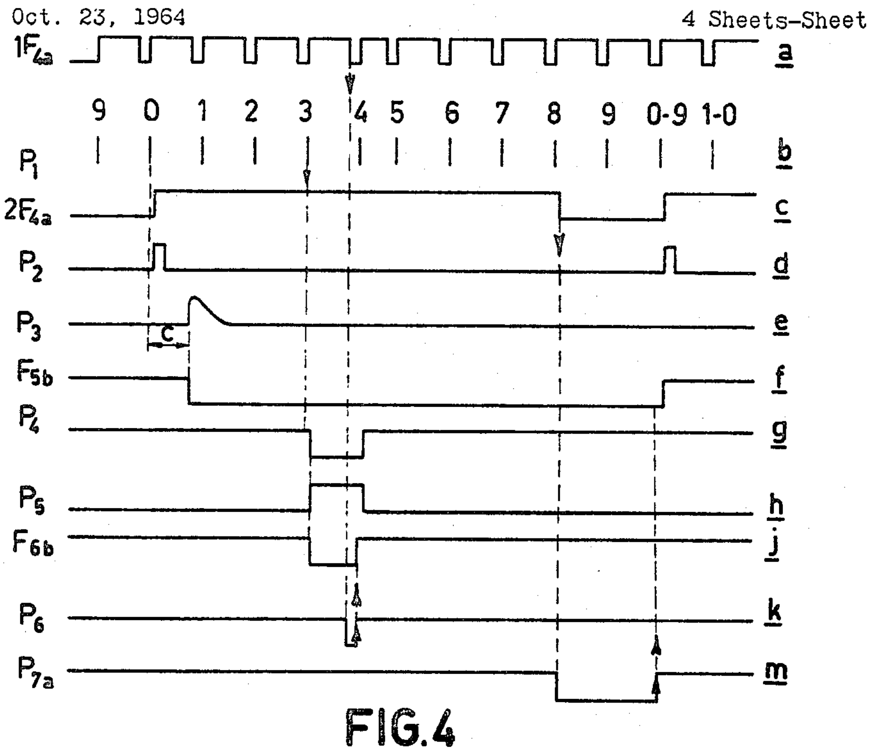
FIG. 4 shows a few pulse diagrams to explain the operation of the adjustable frequency divider shown in FIG. 2.
FIG. 5 is a table showing the relationship between the position of the selection switch and the position of the flip-flops in the adjustable frequency division stage shown in FIG. 3.

Thus the counting decades T1–T5 are in the condition zero at the instant at which a setting signal is supplied to the terminals K1–K5, the flip-flops F1–F3 being in the condition zero and flip-flop F4 being in the condition 1 (FIG. 5). The switching contact in each contact arc of the switch SK may be numbered from left to right in FIG. 3 from 0 to 9 and corresponds in this sequence to the counting conditions 0–9. If the switch SK is in the extreme left position, i.e. the condition 0, the setting signal occurring at terminal K is supplied to none of the setting conductors G1–G4, so that the flip-flops F1–F3 remain in condition 0 and flip-flop F4 remains in condition 1. If the switch SK is in position 1 the setting signal is supplied to the setting conductor G1 as a result of which the flip-flop F1 is set in condition 1 and the counting decade is set in condition 1, and so on with the following positions of the switch SK. In the positions 8 and 9 of the switch SK, flip-flop F4 is set in condition 0 as a result of which a positive amplitude step occurs at the *b*-output which is supplied, through coupling capacitor C2 and diodes D1 and D2, to the setting conductors G2 and G3. These setting conductors, however, directly receive, both in position 8 and position 9 of the switch SK, a setting pulse from setting terminal K so that the additional setting pulses supplied by flip-flop F4 to the setting conductors G2 and G3 only fix the flip-flops F2 and F3 in position 1.

The first stage of the pulse regenerator between the output of counting decade T5 and the setting terminals K1 and K2 of the counting decades T1 and T2 comprises a flip-flop F5, a positive or-gate OG1, a positive or-gate OG2 and an inverting amplifier V1. The second stage of the pulse regenerator comprises a flip-flop F6 and an or-gate OG3. A positive or-gate is shown in the figures by a circle in which the numeral 1 is represented. The inputs of the or-gate are provided with an arrow in the direction of the circle. The digit 1 indicates that the output of the or-gate has ground potential if at least one of the inputs has ground potential. Consequently a positive step in the amplitude of the voltage of at least one of the inputs is transmitted to the output only if before this instant all the inputs have negative potential. An inverting amplifier is indicated in the figure by an equilateral triangle in which a minus sign is indicated.

FIG. 4*a* shows a wave form 1F4*a* at the *a*-output of flip-flop F4 in the first counting decade T1 and FIG. 4*b* shows the positive output pulses P1 of the counting decade T1. The digits indicated above the pulses P1 indicate the condition in which counting decade T2 is set by a relative pulse. The second pulse from the left in FIG. 4*b* sets counting decade T2 in condition 0 and it is assumed that this pulse, after a time delay *c* causes the pulse P3 at the output of counting decade T5 shown in FIG. 4*e*. The wave form 2F4*a* at the *a*-output of flip-flop F4 in the second counting decade is represented in FIG. 4*c* and in FIG. 4*d* the positive output pulses of the second counting decade are shown. The output pulse P3 of counting decade T5 sets flip-flop F5 in the condition 1 as a result of which the *b*-output assumes a negative potential. The wave form F5*b* at the *b*-output of flip-flop F5 is shown in FIG. 4*f*. The or-gate OG2 is controlled by the *b*-output of flip-flop F5 and by an output of the second counting decade of which the wave form P4 is shown in FIG. 4*g*. This output has ground potential continually except during the time interval in which counting decade T2 is in condition 3. The wave form P4 is derived from the or-gate TG1 shown in FIG. 3 of which the inputs are controlled by the *b*-outputs of the flip-flops F1, F2 and F4 and by the *a*-output of flip-flop F3. In condition 3 of counting decade T2 the flip-flops F1, F2 and F4 are in condition 1 and flip-flop F3 is in condition 0 (FIG. 5) so that the output of the or-gate TG1 has negative potential only in this condition. After the flip-flop F5 has been set from the condition 0 to condition 1, the output of the or-gate OG2 keeps on having ground potential until counting decade T2 is set in condition 3 by an input pulse P1. At this instant a negative amplitude step occurs at the output of the or-gate OG2, the direction of which is inverted by the inverting amplifier V1. Consequently a positive amplitude step occurs at the output of the inverting amplifier V1 which sets the flip-flop F6 in condition 1. As a result of this the *b*-output of flip-flop F6 assumes a negative potential. The wave form P5 at the output of inverting amplifier V1 is represented in FIG. 4*h* and the wave form F6*b* at the *b*-output of the flip-flop F6 is shown in FIG. 4*j*.

The or-gate OG3 in the second regeneration stage is controlled by the *b*-output of flip-flop F6 and by the *a*-output of flip-flop F4 in the first counting decade T1. After flip-flop F6 is set in condition 1, the output of the or-gate OG3 stays at ground potential until the *a*-output of flip-flop F4 in the first counting decade has a negative potential (FIG. 4*a*). The wave form P6 at the output of the or-gate OG3 is shown in FIG. 4*k*. The next following positive amplitude step in wave form 1F4*a* now appears also at the output of the or-gate OG3 and at this instant an output pulse P1 also occurs at the output of counting decade T1. The positive amplitude step at the output of the or-gate OG3 is supplied to setting terminal K1 and effects the presetting of a definite selected counting condition in the counting decade T1. This positive amplitude step is also supplied to a trigger input of flip-flop F6 and sets it in condition 0 as a result of which the *b*-output assumes ground potential and the output of the gate OG3 is maintained at ground potential. The output pulse of counting decade T1 sets the counting decade T2 to the condition 4, so that the output of counting decade T2 at which the wave form P4 appears assumes ground potential and the output of the inverting amplifier V1 assumes a negative potential. The next following output pulse of counting decade T1 sets counting decade T2 to condition 5, the pulse distance from this output pulse to the preceding output pulse being dependent upon the presetting of counting decade T1.

The or-gate OG1 in the first regeneration stage is controlled by the *b*-output of flip-flop F5 and the *a*-output of flip-flop F4 in the second counting decade. The operation of this regeneration stage is quite analogous to the operation of the second regeneration stage. After flip-flop F5 is set to condition 1, the output of the or-gate OG1 stays at ground potential until the *a*-output of flip-flop F4 of the second counting decade T2 assumes negative potential, which is the case when counting condition 8 is reached (FIG. 4*c*). The next following positive amplitude step in the wave form 2F4*a* also appears at the output of the or-gate OG1. The positive amplitude step at the output of the or-gate OG1 is applied to a setting terminal K2 and effects the presetting of counting decade T2 in one of the counting conditions 0–9. This positive amplitude step is also applied to a trigger input of flip-flop F5 and sets it to the condition 0. As a result of this the *b*-output of flip-flop F5 assumes earth potential and the output of the gate OG1 is maintained at ground potential. The wave form P7*a* at the output of the or-gate OG1 is shown in FIG. 4*m*. The next following output pulse P1 of counting decade T1 sets the counting decade T2 to a following counting condition 1–0. If the counting decade T2 was preset to counting condition 9, the following input pulse sets counting decade T2 to condition 0 and the counting decade supplies an output pulse of which the pulse distance to the preceding output pulse is equal to the pulse distance between two successive input pulses. The pulse distance between two successive output pulses of counting decade T2 normally is ten times as large as the pulse distance between two successive input pulses to this decade and only once in each counting cycle, by which is understood a period of the output pulses of counting decade T5, is the pulse distance between two successive output pulses minimally equal to the pulse distance between two successive input pulses. As a result the power of counting decade T3 to distinguish two input pulses must be ten times larger than the distinguishing power of a corresponding counting decade in a non-adjustable frequency divider. The same applies to counting decade T2 because the minimum pulse distance between two successive output pulses of counting decade T2 also equals the pulse distance between two successive input pulses.

Figure 6:
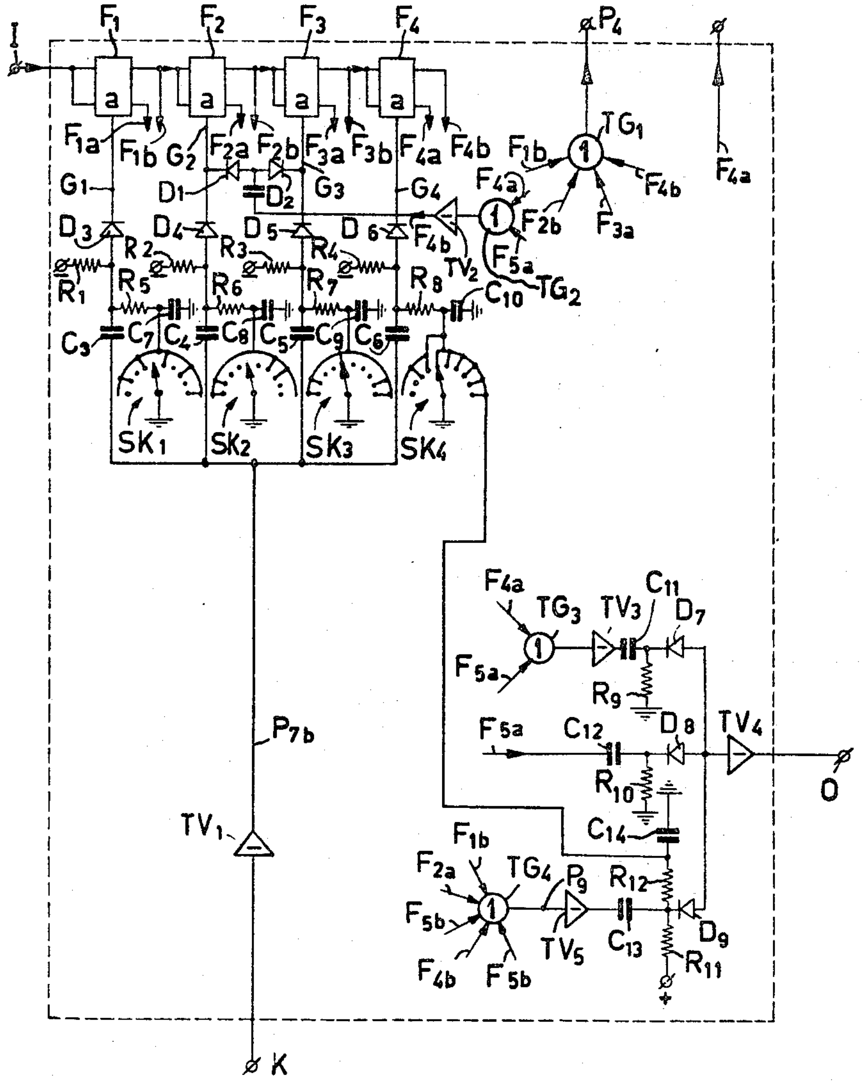
FIG. 6 shows an example of a preferred embodiment of an adjustable frequency division stage suitable for use in the adjustable frequency divider shown in FIG. 2.

Now a frequency division stage will be described with reference to FIG. 6 which is adjustable in ten counting conditions and which is suitable for use in the adjustable frequency divider shown in FIG. 2. In the arrangement of FIG. 6 the minimum pulse distance between two successive output pulses is five times as large as the pulse distance between two successive input pulses. As a result of this the resolving power of the next counting decade in an adjustable frequency divider provided with such counting decades need only be twice as large as that of a corresponding counting decade in a non-adjustable frequency divider. This has the advantage that the counting decade can be constructed with circuit elements, such as transistors and diodes, which operate less rapidly and consequently are cheaper. The counting decade shown in FIG. 6 is meant to replace counting decade T2 in the adjustable frequency divider shown in FIG. 2. The first counting decade T1 of the adjustable frequency divider may in principle be constructed in the same manner as the counting decade T2 in which only the connections with the *a*- and *b*-outputs of flip-flop F5 must be replaced by connections with the *a*- and *b*-outputs of flip-flop F6.

The construction of the counting decade shown in FIG. 6 is to a great extent the same as that of the counting decade shown in FIG. 3 and corresponding components have been given the same reference numerals and only the points of difference will be explained hereinafter. The wave form P7*a* which appears at the setting terminal K2 of the counting decade T2 is inverted by the inverting amplifier TV1 (FIG. 6), as a result of which the negative amplitude step in wave form P7*a* (FIG. 4*m*) at the instant that flip-flop F4 in counting decade T2 is set from condition 1 into condition 0 is converted into a positive amplitude step at the output of the inverting amplifier V1. The pre-adjustment of counting decade T2 consequently takes place at the instant that the negative amplitude step in the wave form P7*a* occurs.

In the counting decade shown in FIG. 3, a positive amplitude step is applied to the setting conductors G2 and G3 at the instant that flip-flop F4 is set from condition 1 to condition 0 by the *b*-output of flip-flop F4. As a result of this the flip-flops F2 and F3 are set in condition 1 and the counting decade is set in condition B6. In the present counting decade shown in FIG. 6 this setting is prevented if flip-flop F5 is in condition 1. For this purpose the setting signal is derived from the *a*-output of flip-flop F4 through or-gate TG2 and an inverting amplifier TG2. A second input of the or-gate TG2 is connected to the *a*-output of flip-flop F5. The *a*-output of flip-flop F5 assumes a ground potential at an instant that the *a*-output of flip-flop F4 still has ground potential and the output of the inverting amplifier TV2 is thus at a negative potential independently of the condition of flip-flop F4 when flip-flop F5 is in condition 1.

Figures 7, 8:
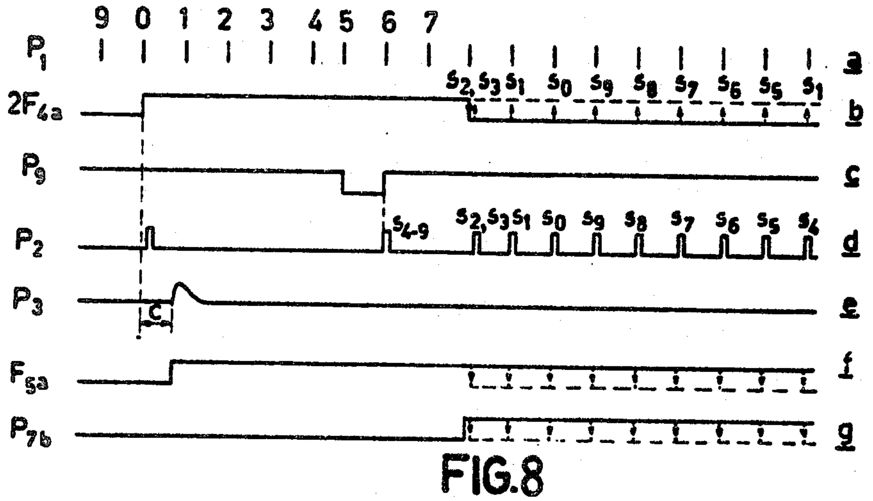
FIG. 7 is a table showing the relationship between the position of the selection switch and the position of the flip-flops in the adjustable frequency stage shown in FIG. 6.
FIG. 8 shows a few pulse diagrams to explain the operation of the adjustable frequency divider shown in FIG. 2 which is provided with an adjustable frequency division stage shown in FIG. 6.

A pre-adjustment of the counting decade takes place at the instant that counting condition 7 is left instead of when counting condition 9 is left. The input pulse which sets flip-flop F4 from condition 1 to condition 0 at this instant also sets flip-flops F1–F3 to condition 0. At the instant of occurrence of the positive amplitude step of the output of inverting amplifier TV1 all flip-flops F1–F4 thus are in condition 0. The condition in which the flip-flops F1–F4 are set in accordance with the position of switch SK is shown in the table of FIG. 7. The conditions assumed by the flip-flops F1–F4 in the counting conditions 0–9 have not experienced any change with respect to FIG. 3 and are thus given by the table of FIG. 5. In the counting decade shown in FIG. 6 a setting signal supplied to setting conductor G4 sets flip-flops F4 in condition 1 in contrast with the counting decade shown in FIG. 3 in which the setting signal sets flip-flop F4 in condition 0. The setting of flip-flop F4 in condition 1 exclusively takes place in the positions 2 and 3 of the switch as appears from the table shown in FIG. 7. In the positions 4–9 of the switch a counting decade is adjusted in the counting conditions B0–B5 while to the positions 0–3 of the switch the counting decade is set in the conditions B6–B9. The 0-condition of the counting decade is condition B6. Consequently the number of input pulses required to set the counting decade from the condition corresponding to the positions 3–9 of the switch to the 0 condition, equals 9, 8, 7, 6, 5, 4 and 3 input pulses respectively. Between the instant that the counting decade was in condition 0 and the setting instant eight input pulses were already applied to the counting decade so that in the positions 3–9 of the switch the number of input pulses applied to the counting decade between two successive 0-conditions equals 17–11 input pulses respectively instead of 7–1 input pulses. In the positions 0–2 of the switch the number of input pulses applied to the counting decade between two successive 0-conditions is 10, 9 and 8 input pulses respectively which is is the required number. If there exist 17–11 input pulses respectively between two 0-conditions of counting decade T2 instead of 7–1 input pulses respectively, this results in counting decade T3 always receiving one input pulse too few. This drawback may be avoided by supplying an additional output pulse to the output of counting decade T2 in the positions 3–9 of the switch. The instant of occurrence of this output pulse is chosen to be so that in the most unfavourable position of the switch, i.e. position 9, the pulse distance between two successive output pulses is as large as possible. The counting decade supplies an output pulse at any instant that flip-flop F4 is set from condition 0 into condition 1 so that in the position 3 of the switch, in which both flip-flop F1 and flip-flop F4 are preset in condition 1, the additional output pulses is not required. In the positions 2 and 3 of the switch, flip-flop F4, after having been set in condition 0 by an input pulse, is immediately thereafter set back again in condition 1 (FIG. 7), and consequently it is possible that the output pulse which occurs during the transition from condition 0 to condition 1 has too small an amplitude. However, as was explained with reference to FIGS. 2 and 3, at this instant flip-flop F5 is reset from condition 1 into condition 0. The amplitude step occurring at one of the outputs is used to supply an output pulse when the occurrence of the output pulse is prevented as a result of the change of the condition of flip-flop F4. For this purpose the *a*-output of flip-flop F4 is connected through an or-gate TG3, an inverting amplifier TV3, a coupling capacitor C11, a cross-resistor R9 and a decoupling diode D7 to the input of an inverting amplifier TV4 and a second input of the or-gate TG3 is connected to the *a*-output of flip-flop F5. Flip-flop F5 assumes condition 1 at an instant that flip-flop F4 still is in condition 1 so that the output of the or-gate TG3 is maintained at ground potential until flip-flop F5 assumes condition 1. Further, the *a*-output of flip-flop F5 is connected through a coupling capacitor C12, a cross-resistor R10 and a decoupling diode D8 to the input of inverting amplifier TV4. On resetting flip-flop F5 a negative amplitude step occurs at this *a*-output which is inverted by the inverting amplifier TV4 as a result of this a positive output pulse appears at the output O of the counting decade.

The additional output pulse in the positions 4–9 of the switch is derived from the output of an or-gate TG4, the inputs of which are connected to the *b*-outputs of the flip-flops F1, F3, F4 and F5 and to the *a*-output of flip-flop F2. The output of the or-gate TG4 consequently has negative potential if the counting decade is in condition 5 (FIG. 5) and flip-flop F5 is in condition 1. At the intsant the counting decade is set in condition 6 by an input pulse a positive amplitude step occurs at the output of the or-gate TG4. The output of the or-gate TG4 is connected through an inverting amplifier TG5, a coupling capacitor C13, and a decoupling diode D9 to the input of the inverting amplifier TV4. The junction between the coupling capacitor C13 and the diode D9 is connected on the one side through a resistor R11 to a point of positive potential, which normally cuts off the diode D9, and is grounded on the other side through the series arrangement of a resistor R12 and a decoupling capacitor C14. In the positions 4–9 of the switch SK the junction between the resistor R12 and the capacitor C14 is grounded through contacts in the contact arc SK4. Consequently, the positive cut off voltage at the junction between the coupling capacitors C3 and the diode D9 decreases to such an extent that a negative amplitude step at the output of the inverting amplifier TV5 is applied through coupling capacitor C13 and the diode D9 conducting in the pass direction to the input of the inverting amplifier TV4 at the instant that a positive amplitude step occurs at the input. The amplifier inverts the direction of the amplitude step so that a positive output pulse appears at the output O of the counting decade.

For further explanation of the operation of the counting decade shown in FIG. 6, FIG. 8 shows a few more pulse diagrams. FIG. 8*a* shows a part of the series of output pulses P1 of counting decade T1, the numerals of the pulses indicating in what condition counting decade T2 is set by the relative pulse. FIG. 8*b* shows the wave form 2F4*a* at the *a*-output of flip-flop F4 in counting decade T2. The second pulse from the left in FIG. 8*a* sets counting decade T2 to condition 0 and it is assumed that this pulse after a time delay *c* results in the production of an output pulse P3 (FIG. 8*e*) of counting decade T5. The output pulse of the counting decade T5 sets flip-flop F5 to condition 1. The wave form F5*a* of the *a*-output is shown in FIG. 8*f*. At the instant that counting decade T2 is set in condition 5 the output of the or-gate TG4 assumes a negative potential. The wave form P9 at the output of the or-gate TG4 is shown in FIG. 8*c*. The next following positive amplitude in the wave form P9 occurring at an instant that the counting decade is set in condition 6 results in an output pulse P2 if the selection switch SK is in one of the positions 4–9. In the series of output pulses P2 shown in FIG. 8*d* the positions of the switch at which the relative output pulse appears are indicated. After the counting decade is set to condition 7, the next following input pulse sets all the flip-flops F1–F4 to condition 0. The negative amplitude step at the output of flip-flop F4 sets the flip-flops F1–F4 to a given condition corresponding to the position of the switch SK through the or-gate OG1 (FIG. 2) and inverting amplifier TV1 (FIG. 6). The wave form P7*b* at the output of inverting amplifier TV1 is shown in FIG. 8*g*. In the positions 2 and 3 of the switch the flip-flop F4 is immediately reset to condition 1 and the positive amplitude step at the *a*-output sets flip-flop F5 in condition 0 and the latter supplies an output pulse to output O. In the positions 0, 1 and 4–9 of the switch the flip-flop F4 is set in condition 1 by an input pulse P1 at a later instant and flip-flop F5 supplies an output pulse at the later instant in question. The amplitude steps in the wave forms 2F4*a*, F5*a* and P7*b* at the later instant dependent upon the position of the switch are indicated in broken lines in FIG. 8. In the position 9 of the switch an output pulse occurs at the instant that the counting decade is set in condition 6 and another output pulse occurs after five more input pulses. In the other position of the switch the pulse distance between two successive output pulses is always larger than five times the pulse distance between two successive input pulses. The distinguishing power of counting decade T3 may consequently be five times smaller than is the case in a construction of the counting decade T2 shown in FIG. 3.

As was already noted, counting decade T1 of the adjustable frequency divider shown in FIG. 2 may in principle be constructed in the same manner as counting decade T2 shown in FIG. 6. In this case the connections to the *a*- and *b*-outputs of flip-flop F5 must be replaced by connections to the *a*- and *b*-outputs of flip-flop F6. The operation of the counting decade T1 constructed in this manner further corresponds entirely to the operation of the counting decade T2 constructed in this manner.

Summarising it may be said that an adjustable frequency divider has been provided which—as a result of the choice of the setting instant of the first two frequency division stages independent of the instant of occurrence of the output pulse of the adjustable frequency divider—is particularly suitable for very high pulse recurrence frequencies and in which the distinguishing power of the counting decades may be reduced with increasing order of the counting decades independently of the adjusted division factor.

What is claimed is:

1. An adjustable frequency divider comprising a plurality of cascade connected frequency dividing stages, each of said stages comprising an input terminal, an output terminal, a plurality of setting conductors, and a setting terminal, each of said stages having a plurality of stable states whereby pulses applied to an input terminal of a stage change the states of said stage in a predetermined continuous sequence and a change from one predetermined state results in the production of an output pulse at the output terminal of the respective stage, each of said stages further comprising switching means for selectively connecting said setting terminal to said setting conductors, whereby a pulse applied to a setting terminal sets the respective stage to a state determined by the position of said switching means, a given dividing stage other than the last dividing stage comprising means for providing a time marking pulse corresponding to a predetermined change of state of said given stage, and means responsive to the occurrence of an output pulse at the output terminal of the last of said stages for applying a pulse to each of said setting terminals, said last mentioned means comprising a bistable circuit, means connected to said bistable circuit and responsive to an output pulse from the last dividing stage for setting said bistable circuit to one stable state, AND gate means, means for applying said time marking pulse and an output of said bistable circuit to said gate means as input signals, means for applying the output of said gate means to said bistable circuit for setting said bistable circuit to its other stable state, and means for applying said output of said gate means to the setting terminal of said given dividing stage whereby said given dividing stage is reset in response to an output pulse from the last dividing stage only at a predetermined instant in the count of said given dividing stage.

2. An adjustable frequency divider comprising a plurality of cascade connected frequency dividing stages, each of said stages comprising an input terminal, an output terminal, a plurality of setting conductors, and a setting terminal, each of said stages having a plurality of stable states whereby pulses applied to an input terminal of a stage change the states of said stage in a predetermined continuous sequence and a change from one predetermined state results in the production of an output pulse at the output terminal of the respective stage, each of said stages further comprising switching means for selectively connecting said setting terminal of said setting conductors, whereby a pulse applied to a setting terminal sets the respective stage to a state determined by the position of said switching means, and pulse transmission means connected between the output terminal of the last dividing stage and the setting terminals of the other dividing stages, the pulse transmission means connected to the setting terminal of at least the first dividing stage comprising pulse regenerating means having first and second stable states, means for setting said regenerating means to said first state in response to an output pulse from said last dividing stage, means for setting said regenerating means to said second state when said other dividing stage connected thereto changes state to a predetermined state, and means for connecting said regenerating means to the setting terminal of the respective dividing means for setting the respective dividing means when said regenerating means changes state to its second state.

3. An adjustable frequency divider comprising a plurality of cascade connected frequency dividing stages, each of said stages comprising an input terminal, an output terminal, a plurality of setting conductors, and a setting terminal, each of said stages having a plurality of stable states whereby pulses applied to an input terminal of a stage change the states of said stage in a predetermined continuous sequence and a change from one predetermined state results in the production of an output pulse at the output terminal of the respective stage, each of said stages further comprising switching means for selectively connecting said setting terminal of said setting conductors, whereby a pulse applied to a setting terminal sets the respective stage to a state determined by the position of said switching means, and pulse transmission means connected between the output terminal of the last dividing stage and the setting terminals of the other dividing stages, the pulse transmission means connected to the setting terminal of the first N dividing stage comprising separate pulse regenerating means having first and second stable states where N is a positive whole number greater than one, means for setting each said regenerating means to said first state in response to an output pulse from said last dividing stage, means for resetting each said regenerating means to said second state when the corresponding dividing stage changes state to a predetermined state, and means for connecting each said regenerating means to the setting terminal of the corresponding dividing means for setting the corresponding dividing means when said regenerating means changes state in a predetermined direction, the means for setting each regenerating means corresponding to the first $(N-1)$ dividing stages comprising gate means connected to the corresponding pulse regenerating means, means for applying a pulse corresponding to a predetermined change of state of the next dividing stage to said gate means, and means for connecting the output of the regenerating means of said next dividing stage to said gate means for controlling said gate means.

4. An adjustable frequency divider comprising a plurality of cascade connected frequency dividing stages, each of said stages comprising an input terminal, an output terminal, a plurality of setting conductors, and a setting terminal, each of said stages having a plurality of stable states whereby pulses applied to an input terminal of a stage change the states of said stage in a predetermined continuous sequence and a change from one predetermined state results in the production of an output pulse at the output terminal of the respective stage, each of said stages further comprising switching means for selectively connecting said setting terminal of said setting conductors, whereby a pulse applied to a setting terminal sets the respective stage to a state determined by the position of said switching means, and pulse transmission means connected between the output terminal of the last dividing stage and the setting terminals of the other dividing stages, the pulse transmission means connected to the setting terminal of at least the first dividing stage comprising pulse regenerating means having first and second stable states, means for setting said regenerating means to said first state in response to an output pulse from said last dividing stage, means for setting said regenerating means to said second state when said other dividing stage connected thereto changes state to a predetermined state, means for connecting said regenerating means to the setting terminal of the respective dividing means for setting the respective dividing means when said regenerating means changes state in a predetermined direction, one of said frequency dividing stages which has a corresponding pulse regenerating means comprising a plurality of cascade connected binary stages and feedback means responsive to a change of state from a predetermined end state to reset said binary stages to a predetermined starting state, whereby said one dividing stage normally counts less than the capacity of said binary stages, and means responsive to an output of said corresponding regenerating means for disabling said feedback means in response to reception of an output pulse from said last dividing stage.

5. The frequency divider of claim 4 comprising means for adding a pulse to the output terminal of said one dividing stage at a time corresponding to a predetermined number of input pulses following the last output pulse of said one dividing stage, in response to the resetting of said dividing stage to a state outside of the normal sequence in which said feedback means is operative.

References Cited

UNITED STATES PATENTS

| | | | |
|---|---|---|---|
| 2,560,968 | 7/1951 | MacSorley | 328—48 |
| 2,623,171 | 12/1952 | Woods-Hill et al. | 328—48 X |
| 2,519,184 | 8/1950 | Grosdoff | 328—48 |
| 3,096,483 | 7/1963 | Ransom | 328—48 |
| 3,241,017 | 3/1966 | Madsen et al. | 328—48 X |

JOHN S. HEYMAN, *Primary Examiner.*

ARTHUR GAUSS, *Examiner.*